UNITED STATES PATENT OFFICE.

CHARLES WEIZMANN, OF KENSINGTON, AND DAVID ALLISTON LEGG, OF CLAPHAM COMMON, LONDON, ENGLAND.

MANUFACTURE OF HYDROCARBONS.

1,395,620.   Specification of Letters Patent.   Patented Nov. 1, 1921.

No Drawing.   Application filed November 10, 1917.   Serial No. 201,404.

*To all whom it may concern:*

Be it known that we, Dr. CHARLES WEIZMANN, a subject of the King of Great Britain and Ireland, and residing at 41 Campden House road, Kensington, London, W. 8, England, and DAVID ALLISTON LEGG, a subject of the King of Great Britain and Ireland, and residing at 15 Sisters avenue, North Side, Clapham Common, London, S. W., England, have invented certain new and useful Improvements Relating to the Manufacture of Hydrocarbons, (for which I have filed an application in Great Britain, March 7, 1916,) of which the following is a specification.

This invention relates to the production of hydrocarbons of the naphthene series. It is known that if 2-butene or 3-butene is treated with strong mineral acids by passing the gas through the liquid, it can be converted into polymers (chiefly tri- and dibutenes). Under these conditions, however, conversion is usually incomplete, and is accompanied by a partial conversion into terpene like bodies.

Our invention consists broadly in polymerizing these butenes in the gaseous or liquid state by means of a catalyst.

Our invention further consists in liquefying butenes and treating with a catalyst such as anhydrous aluminium chlorid or ferric chlorid at suitable temperatures, varying with the pressure employed, so that polymerization is effected into a mixture of hydrocarbons of the naphthene series.

Our invention further consists in a combined process in which normal primary butyl alcohol is treated for the production of 2-butene or a mixture of 2-butene and 3-butene, and the product subsequently treated with a catalyst for the production of hydrocarbons of the naphthene series.

In carrying this invention into effect in one form, we prepare butenes from normal primary butyl alcohol as follows:—

We pass the vapor of normal primary butyl alcohol at about atmospheric pressure through a heated tube preferably containing aluminium oxid carried as a coating on small pieces of pumice, and heated to about 250° C. to 320° C. The decomposition products are principally 2-butene and 3-butene in the proportions of about 80% of the former to about 20% of the latter. If the temperature be raised, the proportion of 2-butene increases, and at from 360° C. to 390° C., the product is practically 2-butene alone, and the yield nearly theoretical. We then liquefy the 2-butene, and pass it into intimate contact with a catalyst such as anhydrous aluminium chlorid or anhydrous ferric chlorid; for example, 28 gms. of butene are liquefied by cooling, and treated with 0.5 gm. of aluminium chlorid (anhydrous). Reaction takes place energetically, and the vessel should be cooled to prevent loss. The butene becomes rapidly polymerized with the production of hydrocarbons of the naphthene series. A suitable temperature, if pressure is to be avoided, is —10° C., and the reaction is complete in about two hours. We find that the yield is practically quantitative. The products obtained under the conditions indicated were:

8 grams of oil boiling at 260–270° C., (under 17 mm. pressure).

13 grams of oil boiling at 270–350° C., (under 17 mm. pressure).

5 grams of oil boiling above 350° C., (under 17 mm. pressure).

In carrying the invention into effect in another form, where a pressure vessel is employed, the reaction may be allowed to proceed at a higher temperature, say 15° C.; the vessel being jacketed to maintain the temperature. The butene vapor may be passed on its production into the reaction tube or vessel, and care should be taken to keep the reaction under control by suitable cooling by the jacket.

Having now described our invention, what we claim as new and desire to secure by Letters Patent is:—

1. The production of hydrocarbons of the naphthene series by polymerization of butene in a liquid state by means of a catalyst.

2. The production of hydrocarbons of the naphthene series by liquefying the butenes, and treating them with a catalyst comprising anhydrous aluminium chlorid.

3. The production of hydrocarbons of the naphthene series from butenes, by liquefying the latter by cooling, and causing the liquid to come intimately into contact with a catalyst comprising anhydrous aluminium chlorid while maintaining a butene liquefying temperature.

In testimony whereof we have signed our names to this specification.

CHARLES WEIZMANN.
DAVID ALLISTON LEGG.